US011999184B2

(12) United States Patent
Cuban

(10) Patent No.: US 11,999,184 B2
(45) **Date of Patent: *Jun. 4, 2024**

(54) PALM PEN

(71) Applicant: Mark Cuban, Dallas, TX (US)

(72) Inventor: Mark Cuban, Dallas, TX (US)

(73) Assignee: ZuMedia Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/815,753

(22) Filed: Jul. 28, 2022

(65) Prior Publication Data

US 2023/0226843 A1 Jul. 20, 2023

Related U.S. Application Data

(63) Continuation of application No. 17/648,533, filed on Jan. 20, 2022, now Pat. No. 11,413,901.

(51) Int. Cl.

| | |
|---|---|
| ***B43K 5/00*** | (2006.01) |
| ***B43K 5/02*** | (2006.01) |
| ***B43K 5/14*** | (2006.01) |
| ***B43K 23/12*** | (2006.01) |
| ***B43K 29/00*** | (2006.01) |

(52) U.S. Cl.

CPC .............. *B43K 5/005* (2013.01); *B43K 5/025* (2013.01); *B43K 5/145* (2013.01); *B43K 23/12* (2013.01); *B43K 29/004* (2013.01)

(58) Field of Classification Search

CPC .......... B43K 5/005; B43K 5/14; B43K 5/145; B43K 7/005; B43K 8/003; B43K 23/004; B43K 23/016; B43K 29/20; B43K 31/00

See application file for complete search history.

(56) References Cited

U.S. PATENT DOCUMENTS

| | | | |
|---|---|---|---|
| 1,438,114 | A | 12/1922 | Hume |
| 1,744,951 | A | 1/1930 | Ogden |
| 2,045,774 | A | 6/1936 | Hirschy |
| 2,961,999 | A | 11/1960 | Aldo |
| 3,020,884 | A | 2/1962 | Riepe et al. |

(Continued)

FOREIGN PATENT DOCUMENTS

| | | | |
|---|---|---|---|
| CN | 203739466 | U | 7/2014 |
| CN | 107336436 | A | 11/2017 |

(Continued)

*Primary Examiner* — David P Angwin
*Assistant Examiner* — Bradley S Oliver
(74) *Attorney, Agent, or Firm* — Tarter Krinsky & Drogin LLP

(57) ABSTRACT

Disclosed is a pen for writing, referred to as a palm pen herein because the body of the pen fits into the palm of a human hand. The palm pen can include a spherically shaped body, and an ink delivery system. The ink delivery system can include a tip having an end connected to the body and an opposite end comprising a nib, an ink conduit having an end coupled to the nib within the tip and an opposite end extending inside the body, and a first ink cartridge fluidly coupled with the opposite end of the ink conduit and contained within the body. The ink delivery system can additionally include a cartridge holder having an active cartridge slot for the first ink cartridge and cartridge storage slots for storage of additional ink cartridges.

20 Claims, 9 Drawing Sheets

(56) References Cited

U.S. PATENT DOCUMENTS

| | | | | |
|---|---|---|---|---|
| 3,310,035 | A * | 3/1967 | Cena | B43K 31/00<br>401/89 |
| 4,035,865 | A | 7/1977 | McRae et al. | |
| 5,017,035 | A * | 5/1991 | Peters | B43K 5/14<br>401/221 |
| D325,751 | S | 4/1992 | Futino | |
| 5,299,878 | A * | 4/1994 | Lin | B43K 31/00<br>401/35 |
| 5,411,344 | A | 5/1995 | Gagne | |
| 5,470,162 | A | 11/1995 | Rubin | |
| 5,626,430 | A | 5/1997 | Bistrack | |
| 5,696,538 | A | 12/1997 | Kishi | |
| 6,343,885 | B1 | 2/2002 | Heyne | |
| 6,561,710 | B1 | 5/2003 | Shamitoff | |
| D477,022 | S | 7/2003 | Rosenbaum | |
| 6,585,441 | B1 | 7/2003 | Shamitoff | |
| D487,111 | S | 2/2004 | Rosenbaum | |
| D509,851 | S | 9/2005 | Huang | |
| D530,744 | S | 10/2006 | Harrison et al. | |
| 7,438,726 | B2 | 10/2008 | Erb | |
| D595,771 | S | 7/2009 | Oas | |
| D608,826 | S | 1/2010 | Laguatan et al. | |
| D687,888 | S | 8/2013 | Andre | |
| D748,095 | S | 1/2016 | Oikawa | |
| 9,764,589 | B2 * | 9/2017 | Hilton Dunne | A46B 5/025 |
| D809,061 | S | 1/2018 | Wong et al. | |
| 10,380,908 | B2 | 8/2019 | Wong et al. | |
| 2006/0244805 | A1 | 11/2006 | Yeh | |
| 2008/0025784 | A1 | 1/2008 | Mueller | |
| 2016/0245455 | A1 | 8/2016 | Wastersian et al. | |
| 2019/0347507 | A1 | 11/2019 | Wang | |
| 2022/0234379 | A1 * | 7/2022 | Roudaut | B43K 8/026 |

FOREIGN PATENT DOCUMENTS

| | | | |
|---|---|---|---|
| CN | 110143082 | A | 8/2019 |
| FR | 2851497 | A1 | 8/2004 |
| GB | 2264901 | A | 9/1993 |

* cited by examiner

PALM PEN

CROSS-REFERENCE TO RELATED APPLICATIONS

This application is a continuation of U.S. patent application Ser. No. 17/648,533, entitled Palm Pen, filed on Jan. 20, 2022, which is incorporated by reference in its entirety.

FIELD OF THE DISCLOSURE

The present disclosure generally relates to writing instruments, and more particularly to pens.

BACKGROUND

Pens are ubiquitously used as writing instruments by holding the pen between the fingers of the hand. Pens are usually cylindrical in shape, and ink is transferred from the nib of the pen to a substrate (e.g., a piece of paper) by using the hand to contact the nib of the pen with the substrate. Slight pressure applied by the hand is generally used to transfer the ink from the nib to the substrate. Prolonged use of a pen can cause discomfort and even injury, including writer's cramp, inflammation of tendons in the hand or wrist, inflammation of ligaments in the hand or wrist, and exacerbation of preexisting conditions such as arthritis in the joints of the hand.

Ergonomically designed pens address problems associated with discomfort and injury caused by prolonged use of pens.

SUMMARY

Disclosed is pen for writing, referred to as a palm pen herein because the body of the pen fits into the palm of a human hand. The palm pen includes a spherically shaped body, and an ink delivery system. The ink delivery system can include a tip having an end connected to the body and an opposite end comprising a nib, an ink conduit having an end coupled to the nib within the tip and an opposite end extending inside the body, and a first ink cartridge fluidly coupled with the opposite end of the ink conduit and contained within the body. The ink delivery system can additionally include a cartridge holder having an active cartridge slot for the first ink cartridge and cartridge storage slots for storage of additional ink cartridges.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Disclosed is pen for writing, referred to as a palm pen herein because the body of the pen is shaped to fit into the palm of a human hand, as opposed to between the fingers like a traditional pen. The palm pen includes a spherically shaped body, and an ink delivery system. The ink delivery system can include a tip having an end connected to the body and an opposite end comprising a nib, an ink conduit having an end coupled to the nib within the tip and an opposite end extending inside the body, and a first ink cartridge fluidly coupled with the opposite end of the ink conduit and contained within the body. The ink delivery system can additionally include a cartridge holder having an active cartridge slot for the first ink cartridge and cartridge storage slots for storage of additional ink cartridges. The spherically shaped body can have at least two sections, where one section is removably attached to the other for quick access to the ink delivery system. The ink cartridge in the active cartridge slot (engaged in the ink delivery system to deliver ink to the nib) can be swapped or replaced with one of the ink cartridges stored in the cartridge storage slots of the cartridge holder, so as to replenish the supply of ink to the ink delivery system, or to change the color of ink. Embodiments also contemplate that each ink cartridge can have multiple compartments, which allows a single ink cartridge to be disengaged and re-engaged to change the color of ink, or to provide a greater color choice amongst all the ink cartridges having multiple ink compartments. The palm pen disclosed herein thus has the capability to hold multiple ink cartridges, greatly increase ink color selection, and reduces strain on the hand as an ergonomic alternative to traditional pens, enabling prolonged writing and/or use of different ink colors with ease.

Figure 1:
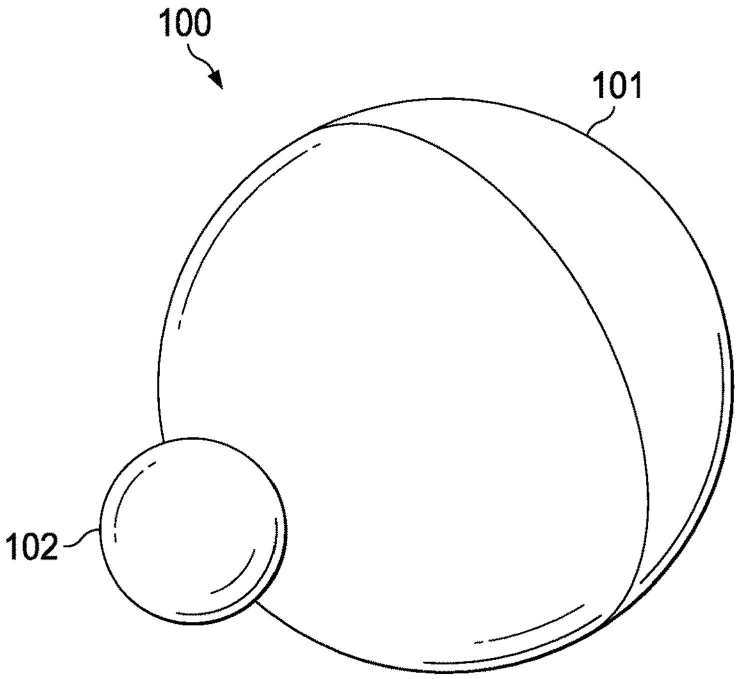
FIG. 1 illustrates a perspective view of the disclosed palm pen.

FIG. 1 illustrates a perspective view of the disclosed palm pen 100. The palm pen 100 includes a spherically shaped body 101, and optionally, a cap 102. In embodiments, the cap 102 can have a spherical shape. The diameter of the spherically shaped body 101 is greater than the diameter of the spherically shaped cap 102 in FIG. 1; however, it is contemplated that the diameter of the spherically shaped body 101 can be equal to or less than the diameter of the spherically shaped cap 102. In embodiments, the diameter of the spherically shaped body 101 can be about 2, 2.5, 3, 3.5, 4, 4.5, 5, 5.5, 6, 6.5, 7, 7.5, 8, 8.5, 9, 9.5, or 10 inches. In embodiments, the diameter of the cap 102 can be about 0.5, 1, 1.5, 2, 2.5, or 3 inches. The spherically shaped body 101 and the cap 102 can be made of any material, such as plastic (e.g., polymer or copolymer of ethylene or propylene or combinations thereof) or metal (e.g., aluminum, titanium, or both).

The spherically shaped body 101 is an ergonomic design for the palm pen 100 that can reduce pressure and stress applied to the joints and muscles of the hand and wrist. Pressure and stress are reduced because the spherical shape disperses the stress from fingers to the palm of the hand.

The spherically shaped body 101 has a hollow interior, e.g., the spherically shaped body 101 is a spherical shell. In embodiments, the spherically shaped body 101 (e.g., the shell) can be formed of two hollow hemispheres that can connect together and be separated, for example, in order to access the ink delivery system (embodiments described in detail below) that is in the hollow interior of the spherically shaped body 101.

In embodiments, the spherically shaped body 101, the cap 102, or both can be coated with a layer of elastomeric material. A user can squeeze the elastomeric material and additionally use the spherically shaped body 101, the cap 102, or both as a stress ball. Moreover, the palm pen 100 can simultaneously function as a writing instrument and stress ball in these embodiments.

In some embodiments of the palm pen 100, fidget devices, such as a fidget spinner, can be connected to the palm pen 100 for use for anxiety relief.

Figure 2:
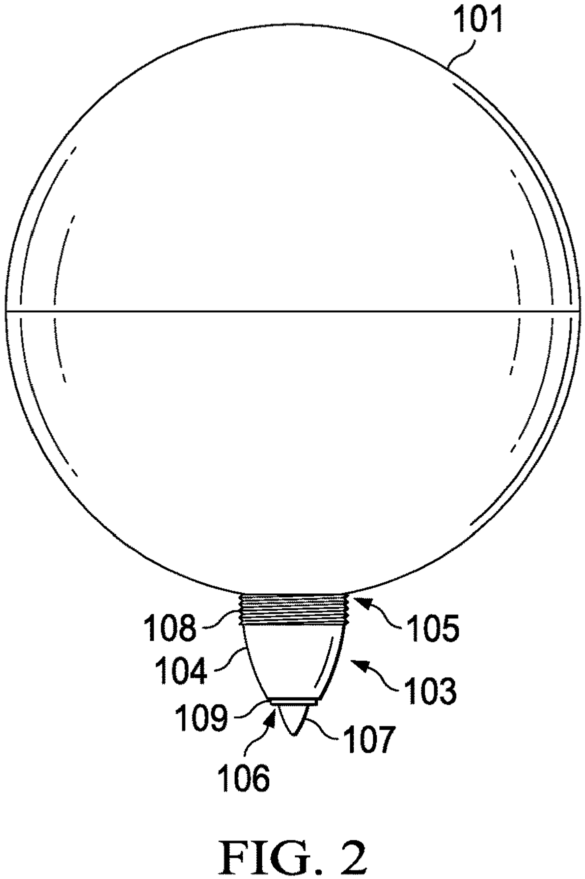
FIG. 2 illustrates a side view of the spherical body and tip of the palm pen.

FIG. 2 illustrates a side view of the spherically shaped body 101 and the tip 104 of the palm pen 100. The tip 104 has an end 105 connected to the body 101 and an opposite end 106 comprising a nib 107. The tip 104 can have a threaded portion 108 proximate the end 105 of the tip 104. The tip 104 is generally tapered from end 105 to opposite end 106. A spacer 109 can be seen holding the nib 107 within the opposite end 106 of the tip 104.

Figure 3:
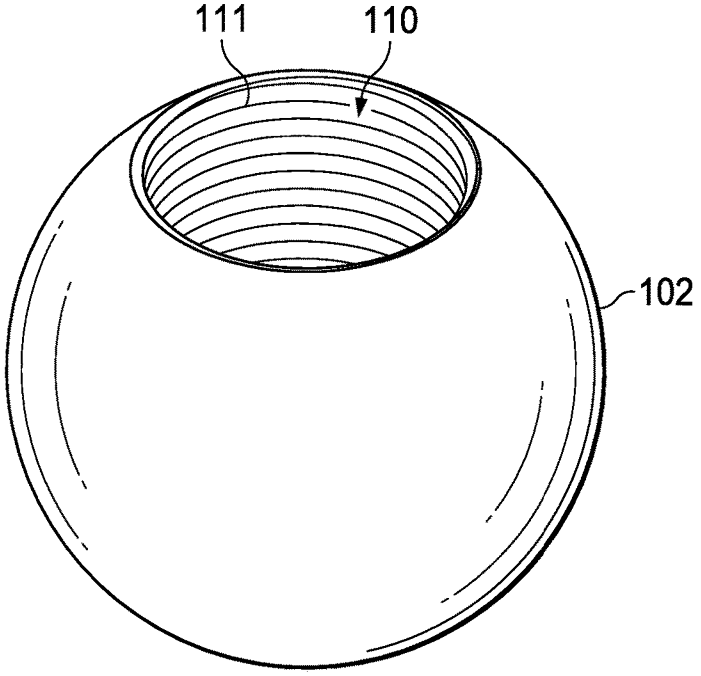
FIG. 3 illustrates a perspective view of the cap of the palm pen.

FIG. 3 illustrates a perspective view of the cap 102 of the palm pen. In embodiments such as that shown in FIG. 3, the cap 102 is a spherically shaped cap. The cap 102 can have a hole 110 formed therein, that is configured to receive the tip 104 of the ink delivery system 103. In embodiments, the hole 110 can have a threaded surface 111, and the threaded surface 111 of the cap 102 can be placed over the threaded portion 108 of the tip 104 to releasably attach and connect the cap 102 to the tip 104 of the palm pen 100. Alternative embodiments contemplate that the cap 102 and tip 104 can be releasably attached by other techniques known in the art with the aid of this disclosure, such as snap-fit or friction-fit technology.

Figure 4:
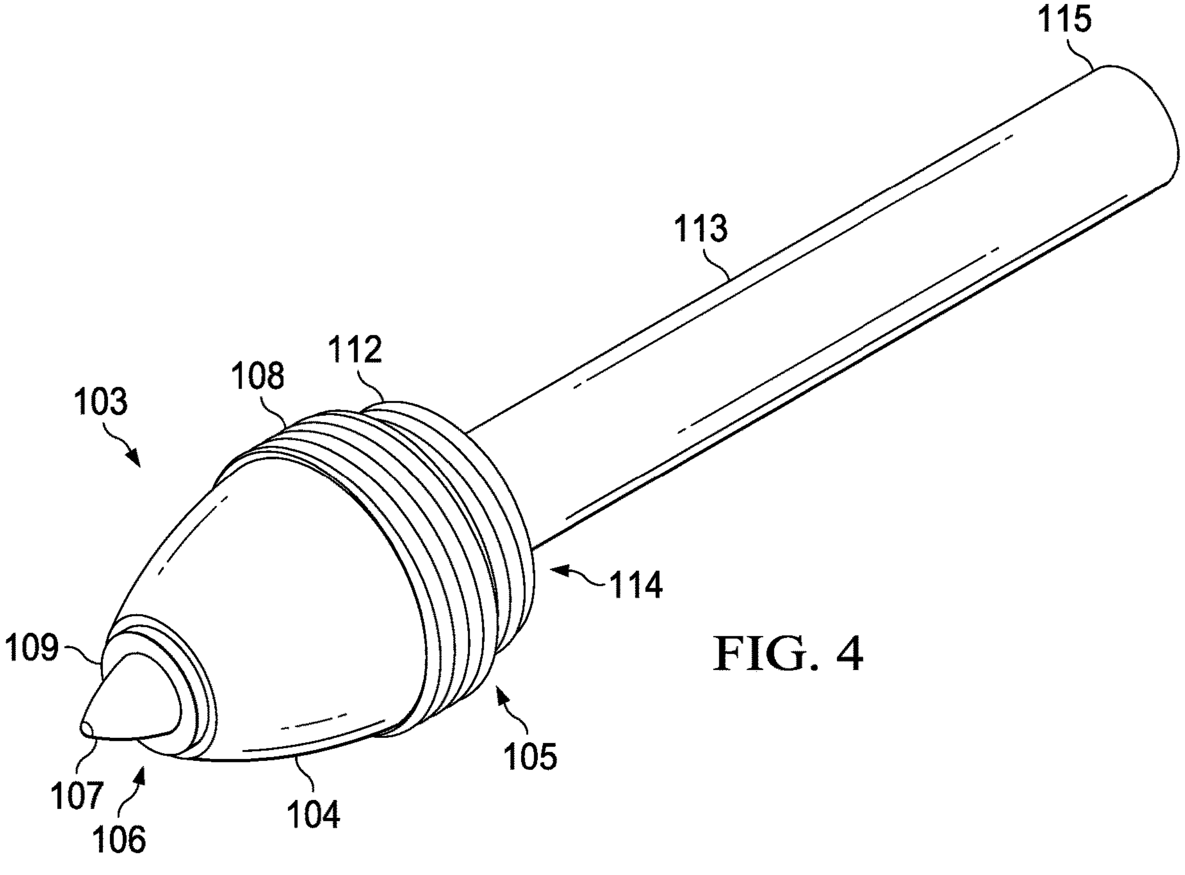
FIG. 4 illustrates a perspective view of an embodiment of an ink delivery system of the palm pen.

FIG. 4 illustrates a perspective view of an embodiment of an ink delivery system 103 of the palm pen 100. The ink delivery system 103 of FIG. 4 has a tip 104 having an end 105 and an opposite end 106 comprising the nib 107. Threaded portion 108 of the tip 104 is proximate to the end 105, and a second threaded portion 112 of the tip 104 is on the end 105. The second threaded portion 112 releasably attaches the tip 104 of the ink delivery system 103 to the spherically shaped body 101 of the palm pen 100. The ink delivery system 103 in FIG. 4 also includes an ink conduit 113 having an end 114 coupled to the nib 107 within the tip 104 and an opposite end 115 that is configured to extend inside the spherically shaped body 101 of the palm pen 100. In FIG. 4, the ink conduit 113 is an ink cartridge, in that, the ink conduit 113 contains ink and is the portion of the ink delivery system 103 that is coupled to the nib 107. Ink contained in the ink conduit 113 (which is also the ink cartridge in this embodiment) flows out of the end 114 of the ink conduit 113 and into the nib 107, and ink then flows out of the nib 107 on opposite end 106 of the tip 104 and onto a substrate, such as a piece of paper.

Figure 5:
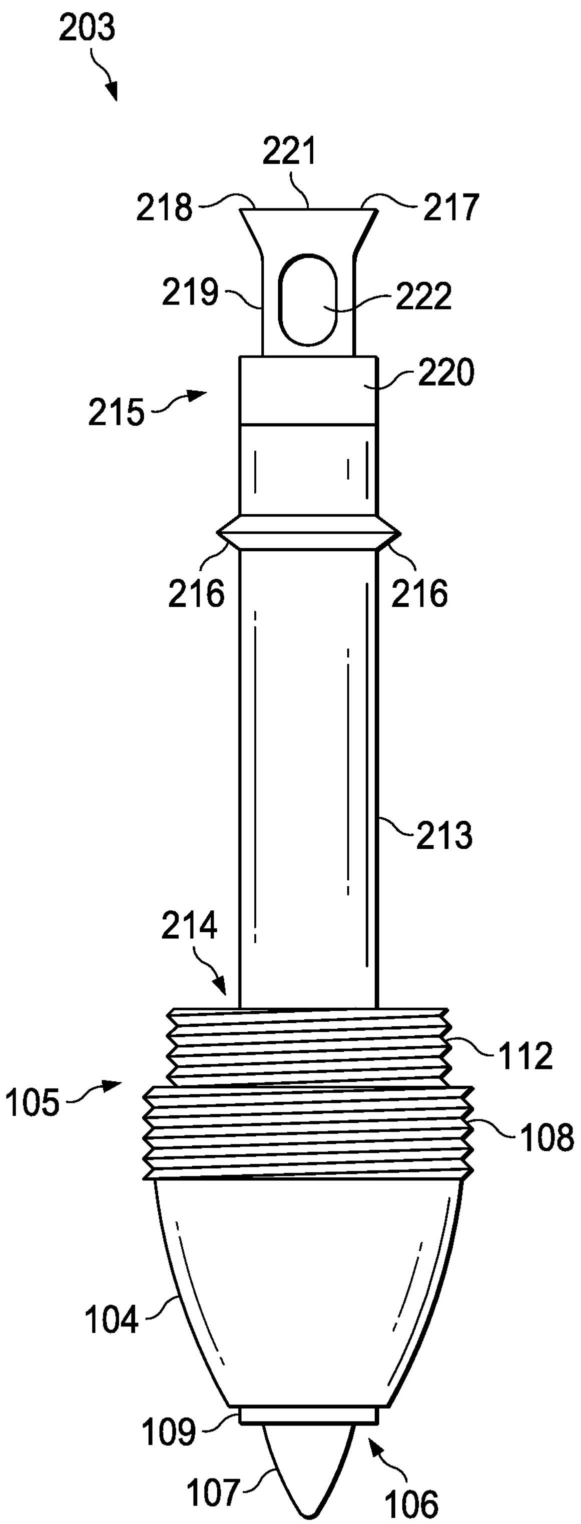
FIG. 5 illustrates a side view of another embodiment of an ink delivery system of the palm pen.

FIG. 5 illustrates a side view of another embodiment of an ink delivery system 203 of the palm pen 100. The ink delivery system 203 of FIG. 5 has a tip 104 having an end 105 and an opposite end 106 comprising the nib 107. Threaded portion 108 of the tip 104 is proximate the end 105, and a second threaded portion 112 of the tip 104 is on end 105. The second threaded portion 112 releasably attaches the tip 104 of the ink delivery system 203 to the spherically shaped body 101 of the palm pen 100. The ink delivery system 203 in FIG. 5 also includes an ink conduit 213 having an end 214 coupled to the nib 107 within the tip 104 and an opposite end 215 that is configured to extend inside the spherically shaped body 101 of the palm pen 100. The ink delivery system 203 in FIG. 5 also includes an ink cartridge (illustrated in FIGS. 8A and 8B) fluidly coupled with the opposite end 215 of the ink conduit 213 and contained within the spherically shaped body 101. Embodiments of ink cartridges are illustrated in FIGS. 6 and 7 and described in more detail herein.

In embodiments, the ink conduit 213 in the ink delivery system 203 can have one or more protrusions 216 that extend radially outwardly from the ink conduit 213. The protrusion(s) 216 can be located proximate the opposite end 215 of the ink conduit 213. The protrusion(s) 216 are configured to engage a corresponding indentation(s) in an ink cartridge so as to i) create a snap-fit connection between the ink delivery system 203 and an ink cartridge, and ii) provide a seal boundary between the ink delivery system 203 and the ink cartridge that prevents ink from passing past the seal boundary formed between the protrusion(s) 216 and indentation(s). Indentations on an ink cartridge are described in more detail for FIG. 8B.

In embodiments, the ink delivery system 203 includes an ink feeder 217 attached to the opposite end 215 of the ink conduit 213. The protrusion(s) 216 described above can be located proximate the ink feeder 217. The ink feeder 217 can have any shape for feeding ink from the interior of an ink cartridge into the opposite end 215 of the ink conduit 213. In FIG. 5, the ink feeder 217 has a top portion 218, a middle portion 219, and a bottom portion 220. The top portion 218 and bottom portion 220 have diameters that are larger than the diameter of the middle portion 219. The top portion 218 can be angled or tapered from a top 221 of the ink feeder 217 to the middle portion 219. The top portion 218 is configured to be inserted into a valve and base portion (described in more detail herein) of embodiments of the disclosed ink cartridge. The middle portion 219 can have a hole 222 formed therein into which ink from the interior of an ink cartridge passes into an interior of the ink feeder 217. The ink can pass into the hole 222 of the middle portion 219, through the bottom portion 220, and into the opposite end 215 of the ink conduit 213. The hole 222 can have any shape, and in FIG. 5, the hole 222 has an oval shape. In embodiments, the hole 222 can have a size such that a portion of the hole 222 extends into the top portion 218 of the ink feeder 217, into the bottom portion 220 of the ink feeder 217, or both into the top portion 218 and into the bottom portion 220 of the ink feeder 217.

Figure 6:
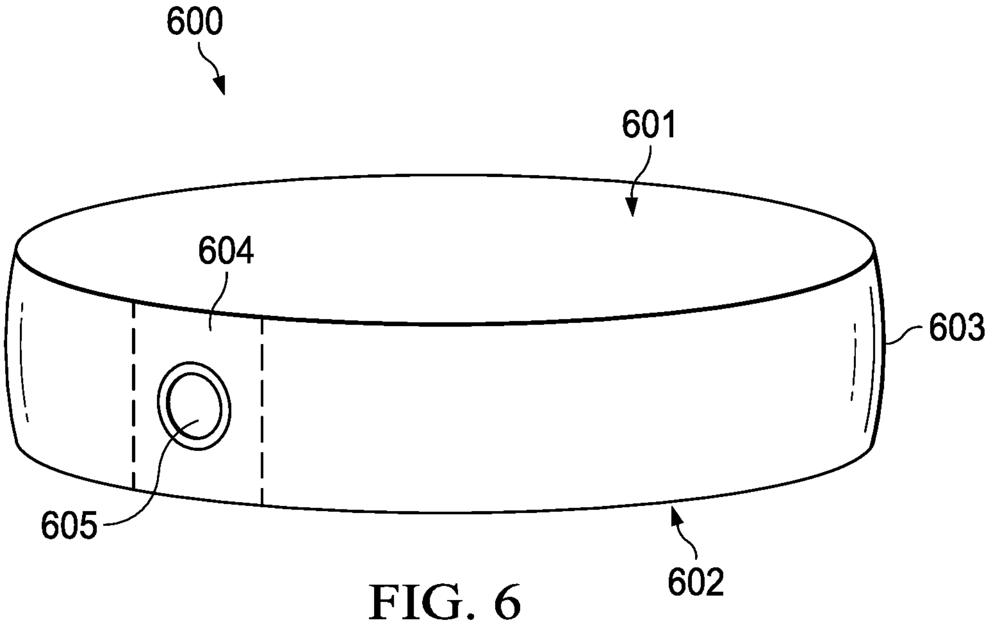
FIG. 6 illustrates a side perspective view of an embodiment of an ink cartridge.
Figure 7:
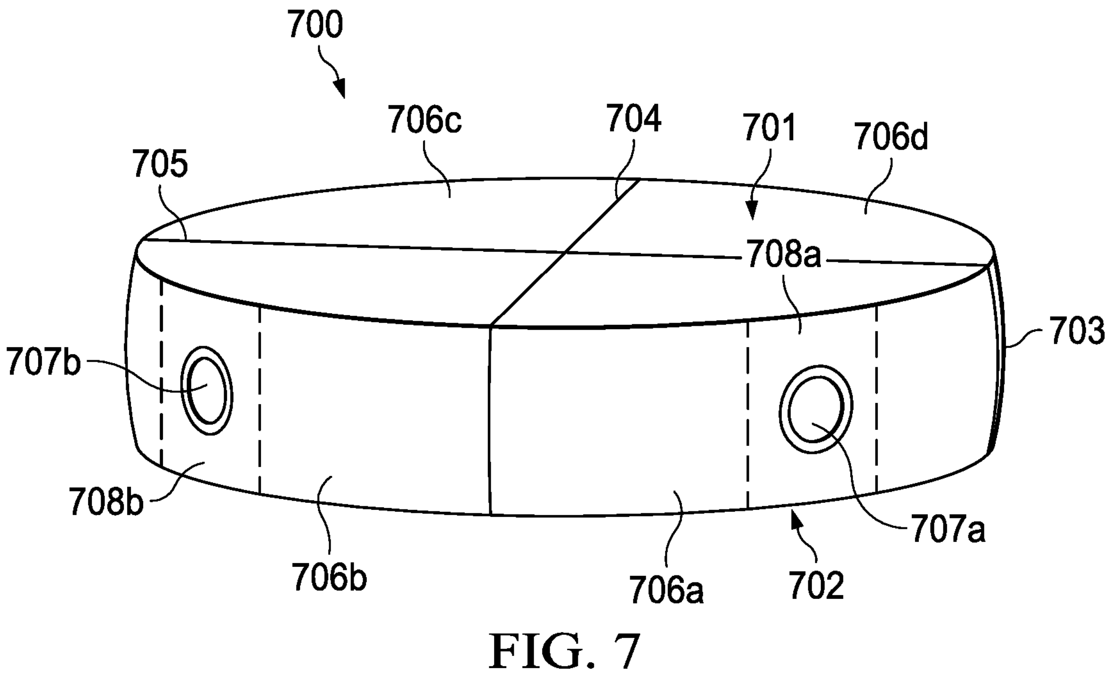
FIG. 7 illustrates a side perspective view of another embodiment of an ink cartridge.

FIG. 6 illustrates a side perspective view of an embodiment of an ink cartridge 600. The ink cartridge 600 has a disc shape; however, other shaped cartridges can be used within the scope of this disclosure, such as oval, triangular, square, rectangular, pentagonal, hexagonal, heptagonal, octagonal, or irregularly shaped. The ink cartridge 600 has walls 601, 602, and 603 that form an ink compartment which holds ink. In FIG. 6, the walls are a top 601, bottom 602, and side wall 603 that form the disc shape. The ink cartridge 600 also has a base portion 604 connected to and inside the walls 601, 602, and 603. The ink cartridge 600 also has a valve 605 placed in the base portion 604. The valve 605 is configured to move from a closed position to an open position when the opposite end 215 of the ink conduit 213 is coupled with the ink cartridge 600. The ink cartridge 600 has a single ink compartment. In embodiments, the valve 605 is a self-closing valve configured to open when coupled with the opposite end 215 of the ink conduit 213 and to close when not coupled with the opposite end 215 of the ink conduit 213. In embodiments, the ink cartridge 600 is refillable through the valve 605.

FIG. 7 illustrates a side perspective view of another embodiment of an ink cartridge 700. The ink cartridge 700 has a disc shape; however, other shaped cartridges can be used within the scope of this disclosure, such as oval, triangular, square, rectangular, pentagonal, hexagonal, heptagonal, octagonal, or irregularly shaped. The ink cartridge 700 has walls 701, 702, 703, 704, and 705 that form multiple ink compartments which hold ink. In the ink cartridge 700 of FIG. 7, the walls 701, 702, 703, 704, and 705 form four ink compartments **706*a*, 706*b*, 706*c*, and 706*d*. In FIG. 7, the walls are a top 701, bottom 702, and side wall 703 that form the disc shape, along with interior partition wall 704 and interior partition wall 705 that divide the interior of the ink cartridge 700 into the four ink compartments 706*a*, 706*b*, 706*c*, and 706*d*. The ink cartridge 700 also has base portions (e.g., base portion 708*a* and 708*b*) for each ink compartment 706*a*, 706*b*, 706*c*, and 706*d*. Each ink compartment 706*a*, 706*b*, 706*c*, and 706*d* has a valve (e.g., valves 707*a* and 707*b* are visible in FIG. 7) placed in the base portions (e.g., base portions 708*a* and 708*b*) of the ink cartridge 700. Each base portion (e.g., base portions 708*a* and 708*b*) is connected to and is located inside the walls 701, 702, and 703. Each of the ink compartments 706*a*, 706*b*, 706*c*, and 706*d* contains ink that is isolated from ink contained in any other of the ink compartments 706*a*, 706*b*, 706*c*, and 706*d* by the partition walls 704 and 705. In embodiments, the valve of each ink compartment 706*a*, 706*b*, 706*c*, and 706*d* is a self-closing valve configured to open when coupled with the opposite end 215 of the ink conduit 213 and to close when not coupled with the opposite end 215 of the ink conduit 213. In embodiments, the ink cartridge 700 is refillable through the valve (e.g., valve 705*a* and 705*b*) of any of the ink compartments 706*a*, 706*b*, 706*c*, and 706*d*. In embodiments, each of the ink compartments 706*a*, 706*b*, 706*c*, and 706*d* can have a color of ink contained therein that is different than the color of ink contained in the other ink compartments 706*a*, 706*b*, 706*c*, and 706*d***.

Figure 8A:
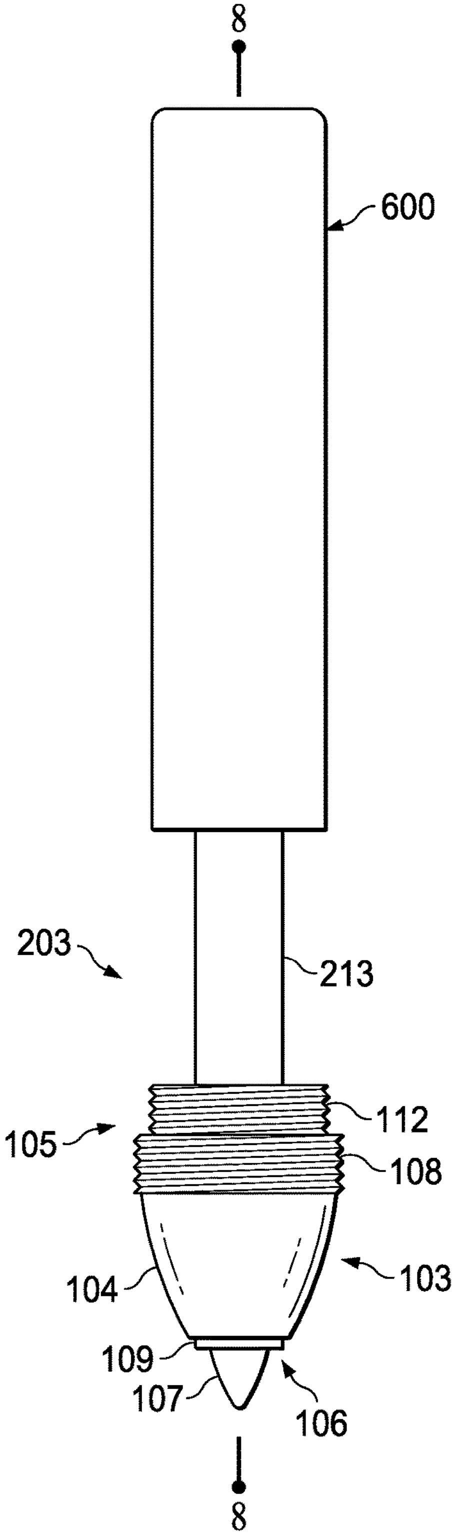
FIG. 8A illustrates a side view of the ink delivery system of FIG. 5, further including the ink cartridge of FIG. 6.
Figure 8B:
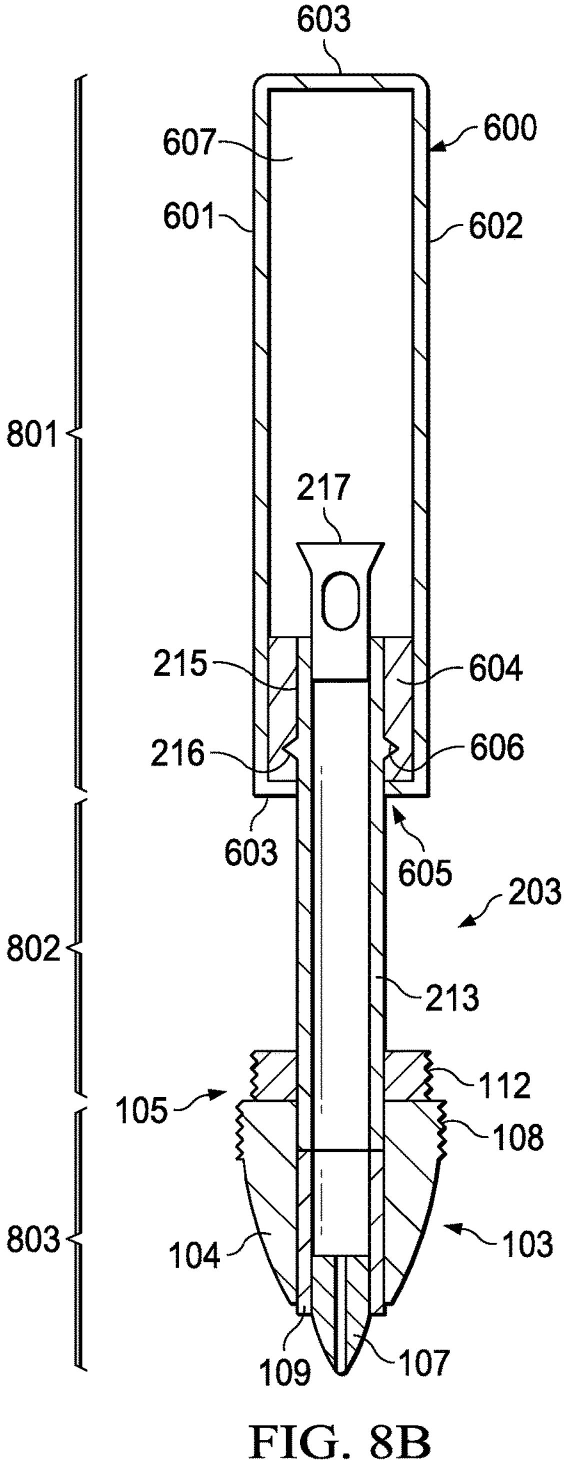
FIG. 8B illustrates a cross-sectional view of the ink delivery system of FIG. 8A, taken along sight line 8-8.

FIG. 8A illustrates a side view of the ink delivery system 203 of FIG. 5, further including the ink cartridge 600 of FIG. 6. FIG. 8B illustrates a cross-sectional view of the ink delivery system 203 of FIG. 8A, taken along sight line 8-8. The interior 607 of the ink cartridge 600 can be seen as defined by the walls 601, 602, and 603 and base portion 604 of the ink cartridge 600. The ink feeder 217 can be seen as attached to the opposite end 215 of the ink conduit 213, and the ink feeder 217 can be as inserted through the valve 605 and base portion 604 of the ink cartridge 600. The ink feeder 217 can also be seen as extending into the interior 607 of the ink cartridge 600 when the ink cartridge 600 is fluidly coupled to the opposite end 215 of the ink conduit 213. The protrusion(s) 216 of the ink delivery system 203 are mated with corresponding indentation(s) 606 formed in the base portion 604 of the ink cartridge 600, creating a snap-fit connection and ink seal between the ink cartridge 600 and the ink delivery system 203.

In FIG. 8B, portions 801 and 802 indicate the portions of the coupled ink delivery system 203 and ink cartridge 600 that are contained with the spherically shaped body 101 of the palm pen 100 (see FIG. 1). Portion 803 is the portion of the coupled ink delivery system 203 and ink cartridge 600 that is outside the spherically shaped body 101 of the palm pen 100.

In FIG. 8B, the valve 605 (e.g., a self-closing valve) of the ink cartridge 600 is in an open position while the ink feeder 217 extends into the interior 607 of the ink cartridge 600.

Figure 9:
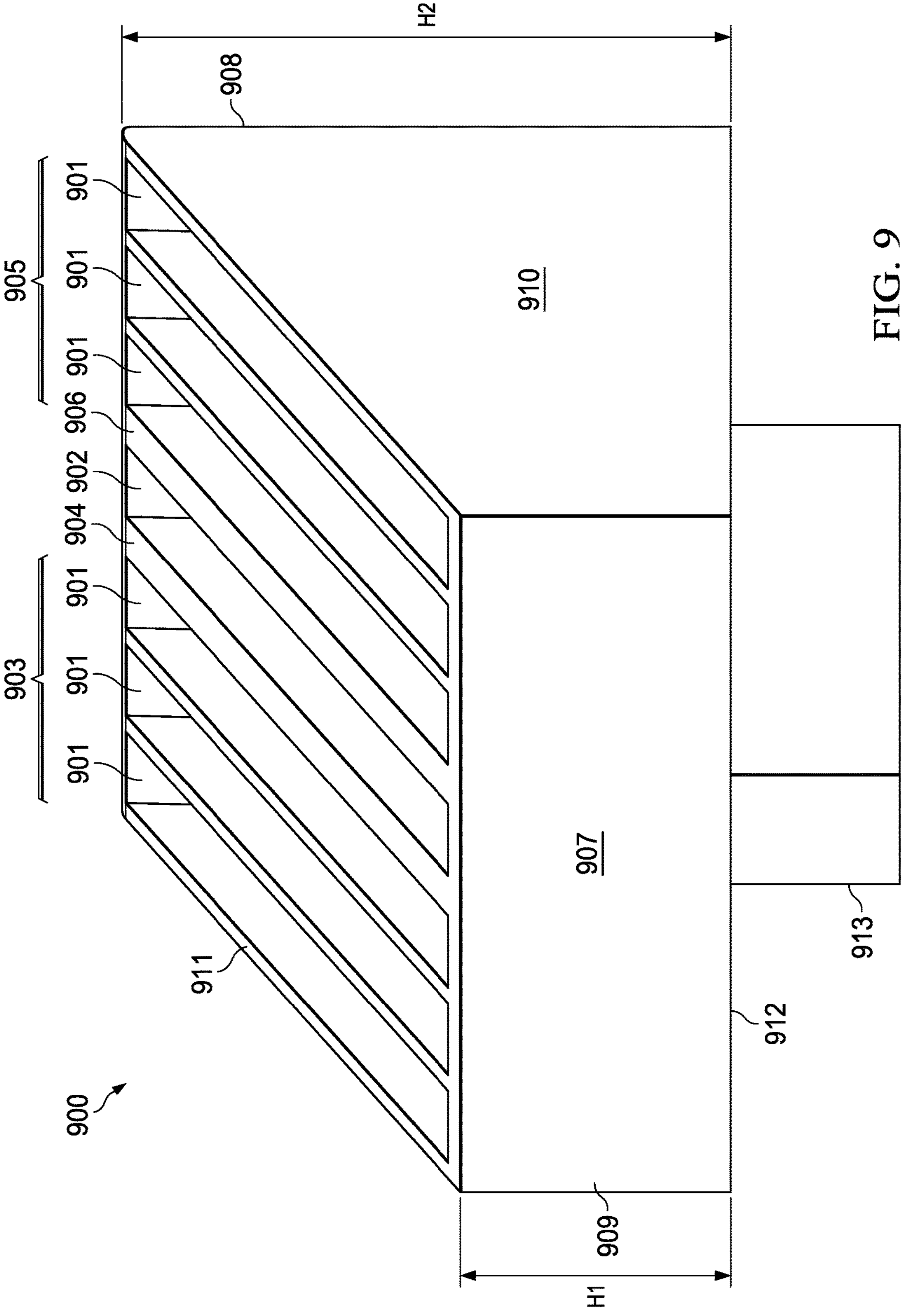
FIG. 9 illustrates a perspective view of a cartridge holder.

FIG. 9 illustrates a perspective view of a cartridge holder 900. Embodiments and aspects of this disclosure contemplate that the ink delivery system 203 additionally includes a cartridge holder 900. The cartridge holder 900 can be contained within the spherically shaped body 101 of the palm pen 100. The cartridge holder 900 can include cartridge storage slots 901 and an active cartridge slot 902. The active cartridge slot 902 is configured to hold a first ink cartridge (e.g., ink cartridge 600 or 700) of the ink delivery system 203, such that the ink cartridge (e.g., ink cartridge 600 or 700) is fluidly coupled with the opposite end 215 of the ink conduit 213 via the cartridge holder 900. One of the cartridge storage slots 901 is configured to hold a second ink cartridge (e.g., another of ink cartridge 600 or 700), for storage. The other cartridge slots 901 can likely be configured to hold additional ink cartridges (e.g., other ink cartridges 600 or 700), for storage. When in storage, the valves of the ink cartridges in the cartridge storage slots 901 are in the closed position. When in the active cartridge slot 902, the valve of the ink cartridge is in the open position. In embodiments where ink cartridge 700 is in the active cartridge slot 902 and valve **705*a* is coupled with the ink conduit 213, the valves of the non-coupled ink compartments 706*b*, 706*c*, and 706*d*** are in the closed position.

In embodiments, a first set 903 of the cartridge storage slots 901 is located on a side 904 of the active cartridge slot 902, and a second set 905 of the cartridge storage slots 901 is located on a second side 906 (e.g., an opposite side) of the active cartridge slot 902.

The cartridge holder 900 can have a front surface 907, a back surface 908, a side 909, and an opposite side 910. In embodiments, a height H1 of the front surface 907 is less than a height H2 of the back surface 908 such that a top 911 of the cartridge holder 900 angles downwardly from the back surface 908 to the front surface 907.

In FIG. 9, the cartridge holder 900 has a slot portion 912 and a pedestal portion 913 below the slot portion 912. The slot portion 912 contains the cartridge storage slots 901 and the active storage slot 902.

Figure 10:
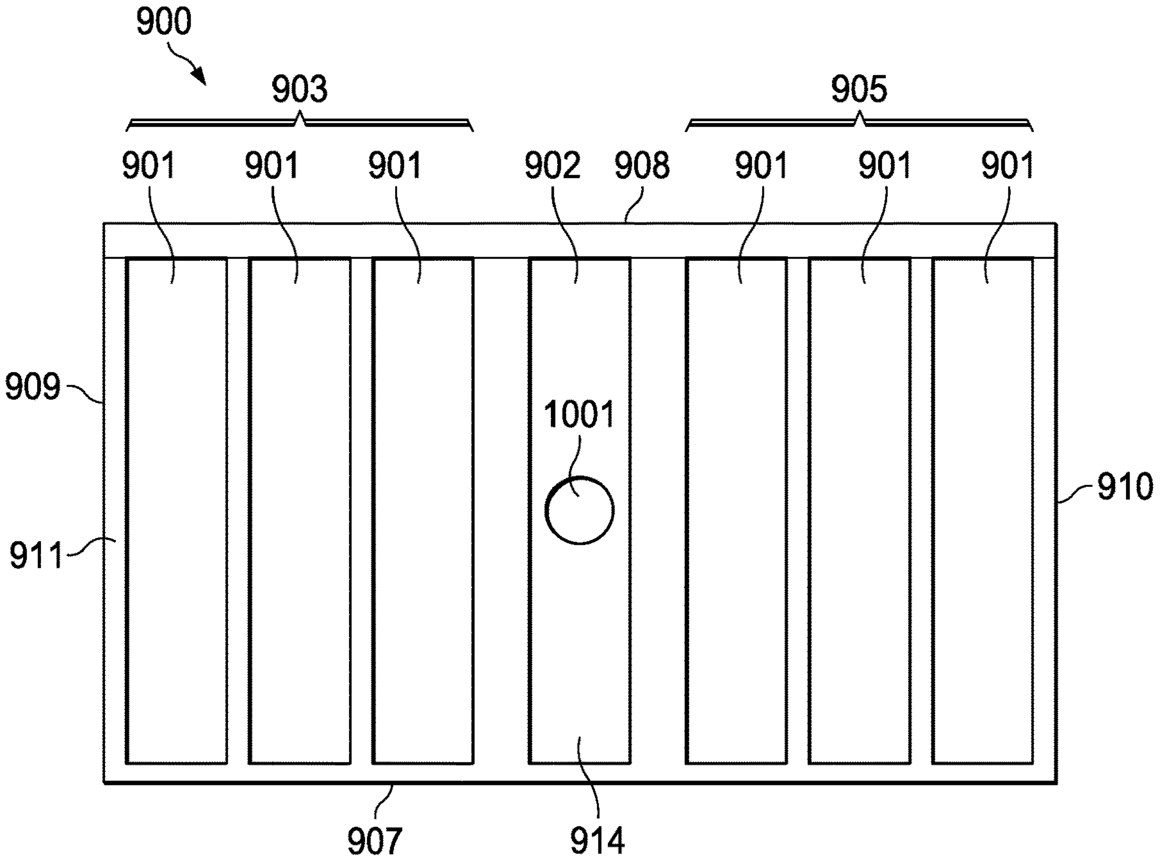
FIG. 10 illustrates a top view of the cartridge holder.

FIG. 10 illustrates a top view of the cartridge holder 900. An ink delivery passage 1001 can be seen opening to a bottom 914 of the active cartridge slot 902. The ink delivery passage 1001 is configured such that the ink feeder 217 and ink conduit 213 of the ink delivery system 203 can pass through the ink delivery passage 1001 so that the ink feeder 217 can couple with an ink cartridge that is held in the active cartridge slot 902. In such embodiments, the opposite end 215 of the ink conduit 213 can extend into or within the active cartridge slot 902 via the ink delivery passage 1001.

Figure 11:
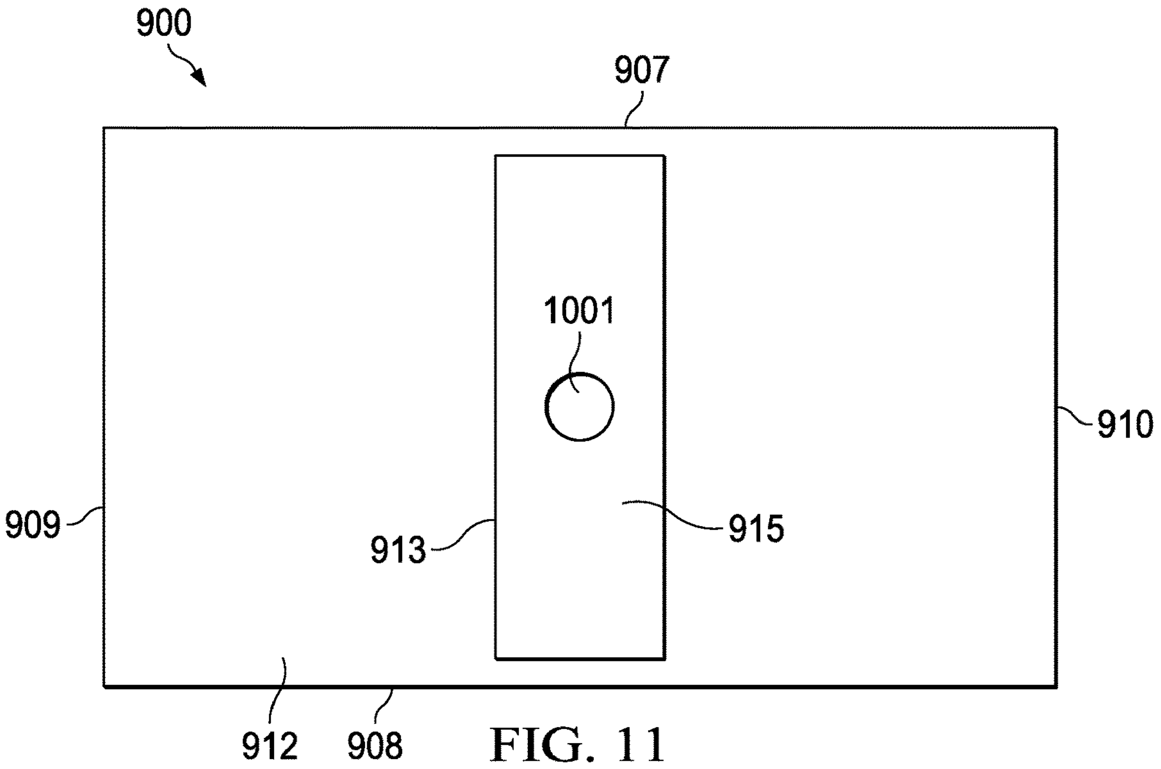
FIG. 11 illustrates a bottom view of the cartridge holder.

FIG. 11 illustrates a bottom view of the cartridge holder 900. The front surface 907, back surface 908, side 909, and opposite side 910 can be seen as defining the bottom view. The bottom view also shows the pedestal portion 913 relative to the slot portion 912 of the cartridge holder 900.

The ink delivery passage 1001 can be seen opening to a bottom 915 of the cartridge holder 900, and particularly in the embodiment in FIG. 11, to a bottom 915 of the pedestal portion 913.

In embodiments, the ink delivery passage 1001 is formed only in the pedestal portion 913; alternatively, the ink delivery passage 1001 is formed in the pedestal portion 913 and extends partially in the slot portion 912 to the bottom 914 of the active cartridge slot 902.

Figure 12:
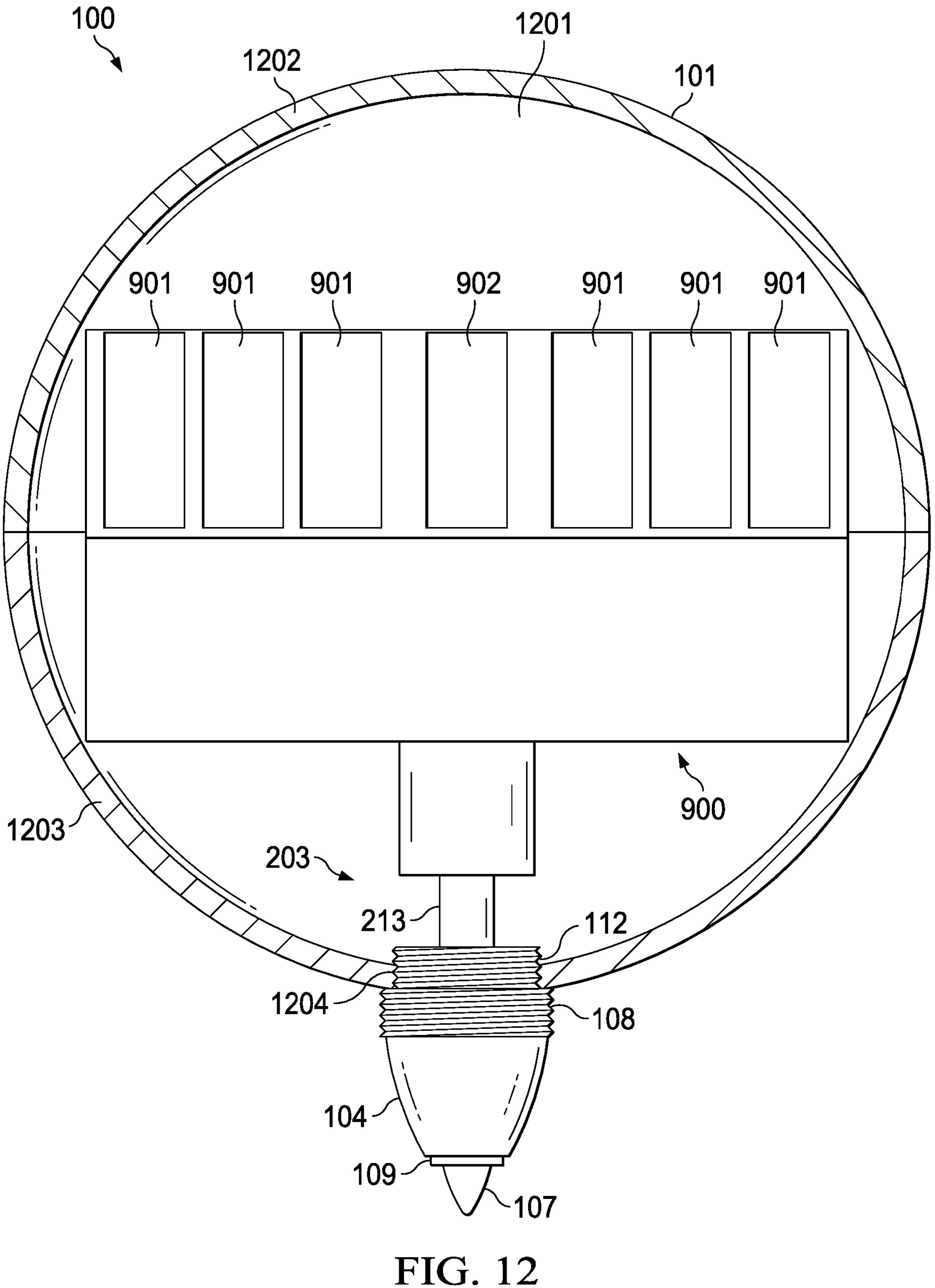
FIG. 12 illustrates a cut-away side view of the palm pen, with the ink delivery system contained in the hollow interior of the spherically shaped body, and without ink cartridges.

FIG. 12 illustrates a cut-away side view of the palm pen 100, with the ink delivery system 203 contained in the hollow interior 1201 of the spherically shaped body 101, and without ink cartridges (for clarity). The spherically shaped body 101 can be made of a first section 1202 that is removable from a second section 1203 so as to access the ink cartridges contained in the cartridge storage slots 901 and the active cartridge slot 902 of the cartridge holder 900 of the ink delivery system 203. In FIG. 12, the first section 1202 has a hollow hemisphere shape, and the second section 1203 has a hollow hemisphere shape; however, it is contemplated that the spherically shaped body 101 can be divided into sections 1202 and 1203 at other cuts of the spherically shaped body 101.

The ink delivery system 203 can be attached to the spherically shaped body 101 by the second threaded portion 112, which is threaded into a threaded hole 1204 formed in the second section 1203 of the spherically shaped body 101.

Figure 13:
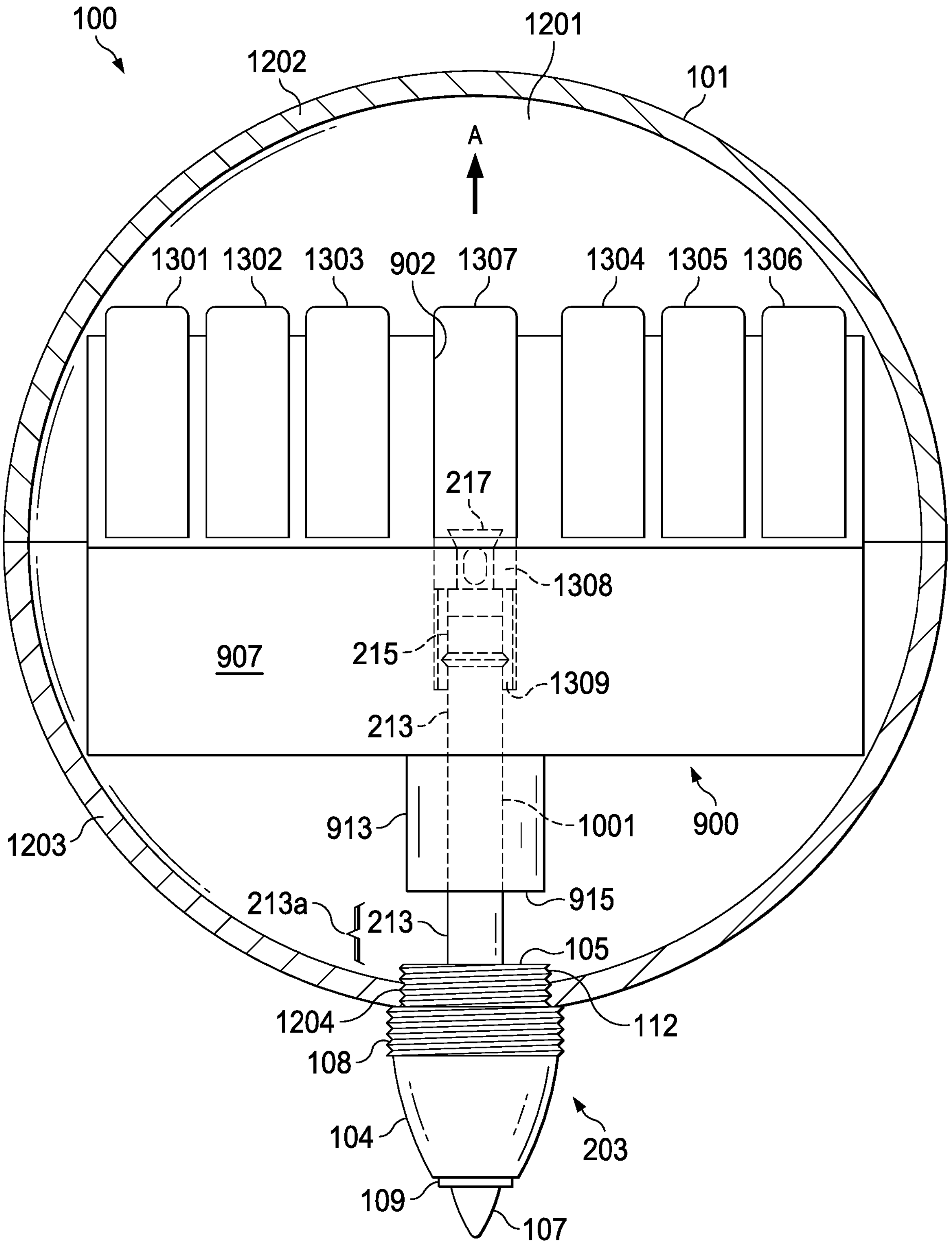
FIG. 13 illustrates a cut-away side view of the palm pen, with the ink delivery system contained in the hollow interior of the spherically shaped body, and with ink cartridges placed in the cartridge holder.

FIG. 13 illustrates a cut-away side view of the palm pen 100, with the ink delivery system 203 contained in the hollow interior 1201 of the spherically shaped body 101, and with ink cartridges 1301, 1302, 1303, 1304, 1305, 1306, and 1307 placed in the cartridge holder 900. Ink cartridges 1301, 1302, 1303, 1304, 1305, 1306, and 1307 are embodied as the ink cartridge 600 shown in FIG. 6; however, it is contemplated that ink cartridges 1301, 1302, 1303, 1304, 1305, 1306, and 1307 can have any embodiment or combination of embodiments. Ink cartridges 1301, 1302, 1303, 1304, 1305, and 1306 are placed in cartridge storage slots 901, and ink cartridge 1307 is placed in the active cartridge slot 902. In embodiments, ink cartridges 1301, 1302, 1303, 1304, 1305, 1306, and 1307 are all part of the ink delivery system 203 even though ink cartridge 1307 is the only ink cartridge engaged for ink delivery to the nib 107. Ink cartridges 1301, 1302, 1303, 1304, 1305, and 1306 are stored in cartridge storage slots 901. All valves on the ink cartridges 1301, 1302, 1303, 1304, 1305, and 1306 are in the closed position while the ink cartridges 1301, 1302, 1303, 1304, 1305, and 1306 are in storage.

Portions of the ink delivery system 203 (e.g., part of the ink cartridge 1307, the ink feeder 217, the opposite end 215 of the ink conduit 213) that are contained behind the front surface 907 of the cartridge holder 900 are shown in dashed lines in FIG. 13. The insertion of the ink feeder 217 and opposite end 215 of the ink conduit 213 into the interior 1308 of the ink cartridge 1307 while the ink cartridge 1307 is in the active cartridge slot 902 of the cartridge holder 900 can be seen in FIG. 13. The ink cartridge 1307 is engaged with the opposite end 215 of the ink conduit 213 in the same manner as described for the ink cartridge 600 in FIGS. 8A and 8B (e.g., protrusions on the ink conduit 213 mate with indentations formed in a base portion 1309 of the ink cartridge 1307; the ink feeder 217 and opposite end 215 of the ink conduit 213 being inserted into the interior 1308 of the ink cartridge 1307 through a valve that is in the open position because of the presence of the ink conduit 213 in the base portion 1309).

In FIG. 13, a portion 213*a* of the ink conduit 213 is exposed in the hallow interior 1201 of the spherically shaped body 101. In some embodiments, the pedestal portion 913 of the cartridge holder 900 can have a size for which the portion 213*a* of the ink conduit 213 is contained in the ink delivery passage 1001, providing additional structural strength to the ink delivery system 203 in the hallow interior 1201 of the spherically shaped body 101. In such embodiments, the bottom 915 of the pedestal portion 913 of the cartridge holder 900 is adjacent to the end 105 of the tip 104 of the ink delivery system 203.

With reference to the portions 801, 802, and 803 in FIG. 8B and the view in FIG. 13, embodiments contemplate that at least part or all of portion 801 of the ink delivery system 203 is contained in the active cartridge slot 902 of the cartridge holder 900, and at least a part or none of portion 802 of the ink delivery system 203 is contained in the pedestal portion 913 of the cartridge holder 900. In embodiments where part of the portion 801 is contained in the active cartridge slot 902, another part of portion 801 can be contained in the pedestal portion 913 of the cartridge holder 900. In embodiments where part of the portion 802 is contained in the pedestal portion 913 of the cartridge holder 900, another part of portion 802 can extend outside the cartridge holder 900 between the cartridge holder 900 and the tip 104.

In embodiments, the ink cartridges 1301, 1302, 1303, 1304, 1305, and 1306 can be in friction-fit arrangement with each corresponding cartridge storage slot 901. For example, portions of at least one wall of the ink cartridges 1301, 1302, 1303, 1304, 1305, and 1306 (e.g., exemplified as side wall 603 of ink cartridge 600 and side wall 703 of ink cartridge 700) can friction-fit against corresponding walls of the corresponding cartridge storage slot 901. The friction-fit arrangement or connection keeps the ink cartridges 1301, 1302, 1303, 1304, 1305, and 1306 in the cartridge storage slots 901 when the palm pen 100 is moved in different directions through use or transport in a bag, for example.

As ink is depleted in the ink cartridge 1307, the user of the palm pen 100 can remove the first section 1202 of the spherically shaped body 101 from the second section 1203 to expose the ink delivery system 203. The depleted ink cartridge 1307 can be replaced by pulling on the ink cartridge 1307 in the direction of arrow A, which breaks the snap-fit connection between the base portion 1309 of the ink cartridge 1307 and the opposite end 215 of the ink conduit 213. As the ink cartridge 1307 is pulled in the direction of arrow A, the ink feeder 217 and opposite end 215 of the ink conduit 213 move out of the ink cartridge 1307, and the valve of the base portion 1309 closes upon removal of the ink feeder 217. The closing of the valve prevents any remaining ink from dripping out of the ink cartridge 1307 during cartridge replacement. Pulling on the ink cartridge 1307 can remove the ink cartridge 1307 from the active cartridge slot 902. A replacement ink cartridge 1301 (e.g., any of ink cartridges 1302, 1303, 1304, 1305, or 1306 could also be used, ink cartridge 1301 is used for example in this discussion) can be pulled in the direction of arrow A to remove the replacement ink cartridge 1301 from the respective cartridge storage slot 901. The replacement ink cartridge 1301 can be inserted into the active cartridge slot 902 in the opposite direction as arrow A, with a valve of the replacement ink cartridge 1301 aligned with the ink feeder 217 so as to insert the ink feeder 217 and opposite end 215 of the ink conduit 213 into the interior of the replacement ink cartridge 1301. The replacement ink cartridge 1301 is moved in the opposite direction of arrow A until the protrusions and indentations are engaged in snap-fit connection. The depleted ink cartridge 1307 can be placed in the open cartridge storage slot 901 where the replacement ink cartridge 1301 used to be stored. After ink cartridge replacement, the first section 1202 of the spherically shaped body 101 can be connected to the second section 1203 for further use of the palm pen 100, with the replacement ink cartridge 1301 being part of and supplying ink to the ink delivery system 203.

Having multiple ink cartridges ready for replacement prevents the palm pen 100 from being discarded after a single ink cartridge is depleted. Moreover, having the spherically shaped body 101 separable into at least two sections 1202 and 1203 allows for replacement of ink cartridges when all ink cartridges 1301, 1302, 1303, 1304, 1305, 1306, and 1307 become depleted, further preventing the palm pen 100 from being discarded since the ink cartridge set can be replaced with a new ink cartridge set full of ink.

In embodiments, the color of ink can be changed when the ink cartridges 1301, 1302, 1303, 1304, 1305, 1306, and 1307 contain different colors of ink. When another color of ink besides the color of ink in the ink cartridge 1307 is desired, the user of the palm pen 100 can remove the first section 1202 of the spherically shaped body 101 from the second section 1203 to expose the ink delivery system 203. The first color of ink in ink cartridge 1307 can be replaced by pulling on the ink cartridge 1307 in the direction of arrow A, which breaks the snap-fit connection between the base portion 1309 of the ink cartridge 1307 and the opposite end 215 of the ink conduit 213. As the ink cartridge 1307 is pulled in the direction of arrow A, the ink feeder 217 and opposite end 215 of the ink conduit 213 move out of the ink cartridge 1307, and the valve of the base portion 1309 closes upon removal of the ink feeder 217. The closing of the valve prevents any remaining first color ink from dripping out of the ink cartridge 1307 during cartridge replacement. Pulling on the ink cartridge 1307 can remove the ink cartridge 1307 from the active cartridge slot 902. A second color of ink in ink cartridge 1301 (e.g., any of ink cartridges 1302, 1303, 1304, 1305, or 1306 have any other color of ink could also be used, ink cartridge 1301 is used for example in this discussion) can be pulled in the direction of arrow A to remove the ink cartridge 1301 from the respective cartridge storage slot 901. The ink cartridge 1301 can be inserted into the active cartridge slot 902 in the opposite direction as arrow A, with a valve of the ink cartridge 1301 aligned with the ink feeder 217 so as to insert the ink feeder 217 and opposite end 215 of the ink conduit 213 into the interior of the ink cartridge 1301. The ink cartridge 1301 is moved in the opposite direction of arrow A until the protrusions and indentations are engaged in snap-fit connection. The previously used ink cartridge 1307 can be placed in the open cartridge storage slot 901 where the ink cartridge 1301 having the second ink color used to be stored. After ink cartridge swap, the first section 1202 of the spherically shaped body 101 can be connected to the second section 1203 for further use of the palm pen 100, with the ink cartridge 1301 being part of and supplying a second color of ink to the ink delivery system 203.

In embodiments where any of ink cartridges 1301, 1302, 1303, 1304, 1305, 1306, and 1307 is embodied with multiple ink compartments such as the ink cartridge 700 in FIG. 7, the other ink compartments can optionally be used in a single ink cartridge before replacement. Disengagement of one ink compartment and engagement of another ink compartment in the same ink cartridge is similarly performed as described for replacing ink cartridge 1307 with ink cartridge 1301, except the ink cartridge that is in the active cartridge slot 902 is temporarily removed, rotated such that the valve corresponding with another ink compartment is aligned with the ink feeder 217, and the valve of the other ink compartment is re-engaged with the ink feeder 217 and opposite end 215 of the ink conduit 213.

In embodiments where any of ink cartridges 1301, 1302, 1303, 1304, 1305, 1306, and 1307 is embodied with multiple ink compartments such as the ink cartridge 700 in FIG. 7, the other ink compartments can optionally have different colors of ink. Disengagement of one ink compartment and engagement of another ink compartment in the same ink cartridge is similarly performed as described for replacing ink cartridge 1307 with ink cartridge 1301, except the ink cartridge that is in the active cartridge slot 902 is temporarily removed, rotated such that the valve corresponding with another color of ink in another ink compartment is aligned with the ink feeder 217, and the valve of the other ink compartment is re-engaged with the ink feeder 217 and opposite end 215 of the ink conduit 213. Alternatively, for an ink color that is contained in the ink compartment of another ink cartridge also having one or more ink compartment, ink cartridge replacement can be similarly performed as described for replacing ink cartridge 1307 with ink cartridge 1301, except, the desired ink compartment containing the desired ink color can be aligned with the ink feeder 217 and engaged with the ink feeder 217 and opposite end 215 of the ink conduit 213.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A pen comprising:

a spherically shaped body; and an ink delivery system comprising:

- a tip having an end connected to the body and an opposite end comprising a nib;
- an ink conduit having an end coupled to the nib within the tip and an opposite end extending inside the body;
- a first ink cartridge fluidly coupled with the opposite end of the ink conduit and contained within the body; and
- a cartridge holder contained within the body and comprising a plurality of cartridge storage slots and an active cartridge slot, wherein the active cartridge slot is configured to hold the first ink cartridge, wherein the first ink cartridge is fluidly coupled with the opposite end of the ink conduit via the cartridge holder, wherein one of the plurality of cartridge storage slots is between the active cartridge slot and another of the plurality of cartridge storage slots.

2. The pen of claim 1, wherein the plurality of cartridge storage slots are located in the cartridge holder on a side of the active cartridge slot.

3. The pen of claim 1, wherein the cartridge holder further comprises a second plurality of cartridge storage slots.

4. The pen of claim 3, wherein the second plurality of cartridge storage slots is located in the cartridge holder on an opposite side of the active cartridge slot.

5. The pen of claim 1, further comprising:

a spherically shaped cap having a hole formed therein, wherein the hole is configured to receive the tip, wherein the hole has a threaded surface, wherein the tip has a threaded portion proximate to the end of the tip, wherein the threaded surface is placed over the threaded portion to connect the cap to the tip.

6. The pen of claim 1, wherein the ink delivery system further comprises:

an ink delivery passage that opens to a bottom of the active cartridge slot and to a bottom of the cartridge holder.

7. The pen of claim 6, wherein the active cartridge slot is configured to hold the first ink cartridge of the ink delivery system, wherein the first ink cartridge is fluidly coupled with the opposite end of the ink conduit via the cartridge holder.

8. The pen of claim 7, wherein the opposite end of the ink conduit extends within the active cartridge slot via the ink delivery passage.

9. The pen of claim 7, wherein the ink delivery system further comprises an ink feeder attached to the opposite end of the ink conduit, wherein the ink feeder extends into an interior of the first ink cartridge when the first ink cartridge is fluidly coupled with the opposite end of the ink conduit.

10. The pen of claim 9, wherein the first ink cartridge comprises a self-closing valve, wherein the self-closing valve is in an open position while the ink feeder extends into the interior of the first ink cartridge.

11. The pen of claim 6, wherein the cartridge holder further comprises a pedestal portion below a slot portion, wherein the plurality of cartridge storage slots are formed in the slot portion, and wherein the ink delivery passage is formed in the pedestal portion.

12. The pen of claim 1, wherein the first ink cartridge has a disc shape.

13. The pen of claim 12, wherein the first ink cartridge comprises i) two circular walls and a cylindrical wall that form the disc shape, and ii) a valve on the cylindrical wall.

14. The pen of claim 13, wherein the valve is configured to move from a closed position to an open position when the opposite end of the ink conduit is coupled with the first ink cartridge.

15. The pen of claim 13, further comprising:

a second ink cartridge having a disc shape, wherein the cartridge holder is configured to hold the second ink cartridge in storage in one of the plurality of cartridge storage slots.

16. The pen of claim 15, wherein the second ink cartridge comprises i) two circular walls and a cylindrical wall that form the disc shape, and ii) a valve on the cylindrical wall.

17. The pen of claim 16, wherein the valve of the second ink cartridge is configured to be in a closed position while the cartridge holder holds the second ink cartridge in storage in one of the plurality of cartridge storage slots.

18. The pen of claim 1, wherein the first ink cartridge comprises a plurality of ink compartments, wherein each of the plurality of ink compartments has a self-closing valve configured to open when coupled with the opposite end of the ink conduit.

19. The pen of claim 18, wherein each of the plurality of ink compartments contains ink that is isolated from ink contained in any other of the plurality of ink compartments.

20. The pen of claim 19, wherein each of the plurality of ink compartments has a color of ink contained therein that is different than the color of ink contained in the other of the plurality of ink compartments.

* * * * *